E. U. & W. L. SCOVILLE.

Door-Hanger.

No. 6,718. Reissued Oct. 26. 1875.

Witnesses:

P. B. McLennan

J. J. Gumoyt

Inventors:

Eliyah U. Scoville

Washington L. Scoville

N. PETERS, PHOTO-LITHOGRAPHER, WASHINGTON, D. C.

UNITED STATES PATENT OFFICE.

ELIJAH U. SCOVILLE AND WASHINGTON L. SCOVILLE, OF MANLIUS, N. Y.

IMPROVEMENT IN DOOR-HANGERS.

Specification forming part of Letters Patent No. 155,623, dated October 6, 1874; reissue No. 6,718, dated October 26, 1875; application filed October 1, 1875.

DIVISION B.

*To all whom it may concern:*

Be it known that we, ELIJAH U. SCOVILLE and WASHINGTON L. SCOVILLE, of Manlius, Onondaga county, New York, have invented certain Improvements in Door-Hangers for Sliding Doors, of which the following is a specification:

In the door-hangers heretofore invented a great difficulty has been found in causing them to run true, so as not to bind on the track, especially when heavily loaded, and they soon wear untrue, so as to cause great friction, often to the extent of rendering them useless. The manufacture has been expensive on account of the grooved wheel that has heretofore been deemed essential.

The object of our invention is to produce a door-hanger the bearings of which cause it to run steady and prevent binding, and the form and construction of the parts of which render the castings and the putting together simple and cheap, giving a greater freedom to the running of the wheel on the track than has ever before been attained in a door-hanger.

Figure 1:
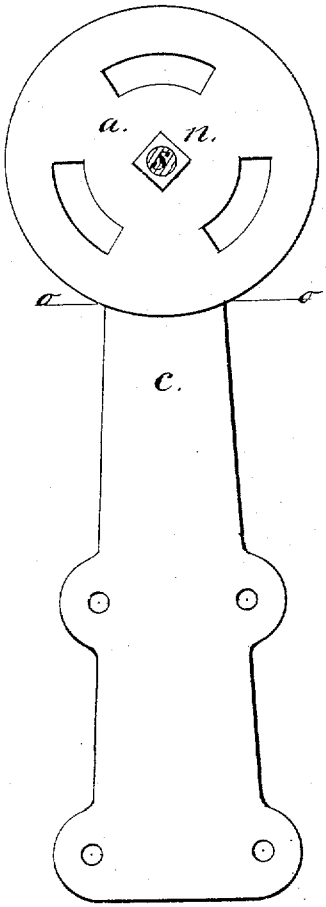
Figure 2:
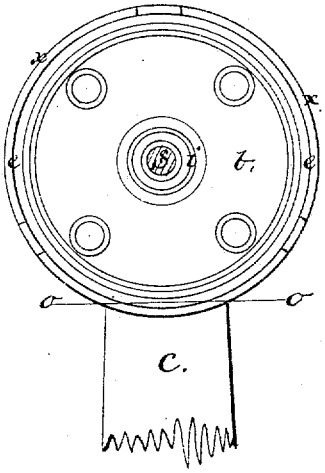
Figure 3:
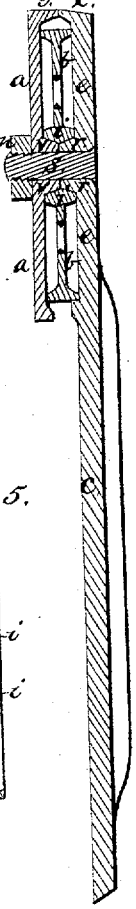
Figure 4:
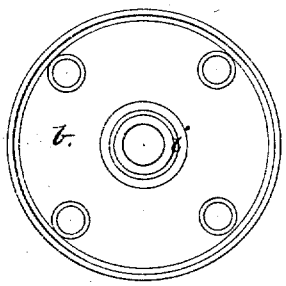
Figure 5:
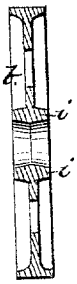
Figure 6:
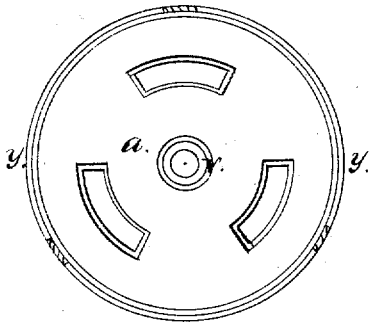
Figure 7:
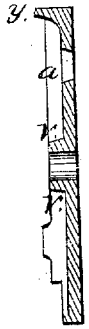

The construction is as follows: Referring to the drawing annexed, Figure 1 shows the cap and shank of the hanger; Fig. 2, the wheel and head of the outside casting, with the cap removed; Fig. 3, a cross-section at right angles to Fig. 1; Fig. 4, side view of the wheel; Fig. 5, cross-section of the same; Fig. 6, inside of the cap *a*; Fig. 7, sectional view through the center of Fig. 6, at right angles thereto.

The same letters refer to like parts in all the figures.

The shank *c* of the hanger, by which it is affixed to the door, has the general configuration of hangers heretofore made. On the upper end of the shank there is a circular cup-shaped head, having a rim, *x*, around its circumference, except for a space at the shank, the rim being irregular on its projecting edge. At the center on the inside there is a truncated conical projection, *r*, having a hole through its axis for a purpose hereafter named. Onto this head *c* a cap, *a*, is fitted, the rim of which is the counterpart of that on the head *e*, so that the projection on its rim *y* fits the recesses in the rim of the head, and thus prevent the possibility of its turning or shifting out of place, so that the truncated cone at *v*, which is in all particulars like that on head *e*, is retained firmly in place. A stout bolt or rivet, *s*, passes through the holes at the center of the truncated cones above named, and holds the cap and head firmly together. *b* is a wheel or pulley, having a straight or plain faced periphery or tread, without flange or groove in it, which is centered upon the truncated cones, the bore of its hub being made to conform to them. This gives a steadiness to its running. The flat tread of the wheel runs upon a fixed rail, indicated by lines *o o*, that enter a space left between the head and the cap on the lower side, as clearly indicated in Fig. 3. This serves to guide the wheel along the track, and prevents it running off. The bore of the hub and the truncated cones are face-hardened. It will be noticed that the wear comes upon these surfaces, and not upon the center bolt, the only office of which is to hold the parts together.

I am aware that guiding-flanges have been essayed to guide the hanger on the rail with a series of rollers, but they have not been employed with a single-wheel hanger, as herein described.

What we claim, and desire to secure by Letters Patent, is—

1. The head *e*, with its shank *c* and cap *a*, having notched and projecting rims made to fit each other, and perforated center bearings, arranged and combined as and for the purposes herein specified.

2. The combination of a plain-faced wheel, *b*, pivoted at its center with the cap *a*, head *e*, and shank *c*, as and for the purposes specified.

ELIJAH U. SCOVILLE.
WASHINGTON L. SCOVILLE.

Witnesses:
P. B. MCLENNAN,
J. J. GRENOUGH.